Sept. 14, 1948.  R. J. MILLER  2,449,404
TREATMENT OF ACID TARS
Filed Aug. 2, 1945
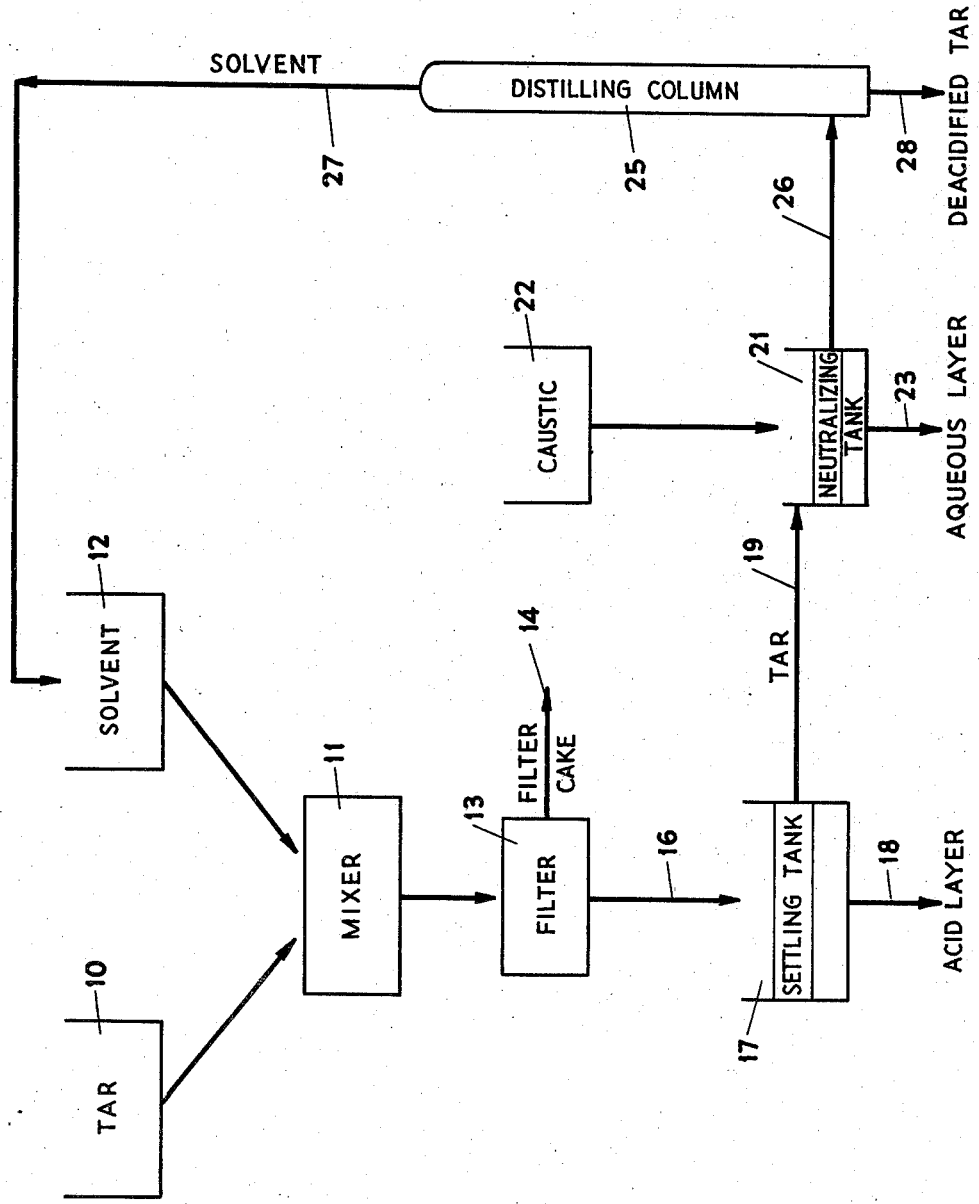
Inventor
ROBERT L. MILLER
by
Attorneys Patented Sept. 14, 1948

2,449,404

UNITED STATES PATENT OFFICE 2,449,404

TREATMENT OF ACID TARS

Robert J. Miller, Berkeley, Calif., assignor to California Research Corporation, San Francisco, Calif., a corporation of Delaware Application August 2, 1945, Serial No. 608,489

4 Claims. (Cl. 196—148)

This invention relates to a method for the treatment of emulsified acid tars and particularly to the demulsification of such tars and to the production of acid free tars therefrom.

It is an object of this invention to provide a method for the production of acid free tars.

It is a further object of this invention to provide a process for the demulsification of acid tars.

It is still another object of this invention to provide a method for the separation of emulsified acid tars into a tar fraction and an acid fraction.

In accordance with these and other objects which will be obvious to those skilled in the art from the disclosure given, this invention consists in a process for the deacidification of emulsified tars resulting from the hydrolysis of sulfuric acid sludges. This process is based on the discovery that these extremely complex emulsified tars may be readily separated into an acid layer and a tar layer by diluting the tar with a liquid having a high solvent power, filtering to remove the small amount of solid material present, separating the filtrate into a tar layer and an acid layer either by stratification or by centrifuging, which tar layer may be treated to produce an acid free tar.

The accompanying figure shows a flow diagram illustrating the process of this invention. Emulsified tar from hydrolized sludge is fed from tank 10 to mixer 11 where it is diluted with a solvent from tank 12. The tar and solvent are intimately mixed with or without the addition of the filter aid and are then fed to filter 13. The solid material (filter cake) is removed from the filter via line 14 and the filtrate is withdrawn via line 16 to settling tank 17. The filtrate is allowed to stratify. The aqueous acid layer is removed via line 18 and the tar layer is removed via line 19 to neutralizing tank 21. Any acid remaining in the tar layer at this point is neutralized with dilute caustic from tank 22. An aqueous layer is allowed to separate and is removed via line 23, and the substantially neutral tar is removed to still 25 via line 26. The tar is now freed of solvent by distillation and the solvent may be recirculated to solvent tank 12 via line 27. Deacidified tar is removed from the still via line 28.

The sludge resulting from the treatment of such stocks as straight run gasoline, kerosenes, cracked naphthas and reformed naphthas may be readily hydrolized with water and steam at moderately elevated temperatures to produce a dilute acid layer and an emulsified tar layer. The process of this invention deals with the treatment of this emulsified tar layer.

An emulsified tar subject to treatment by this method is one which contains up to about 75% by volume of dilute sulfuric acid in the form of an emulsion. These tars will settle only very slowly and incompletely if at all, and even with extreme mechanical working of the tar only about half of the acid phase can be separated. Prolonged heating at elevated temperatures with and without additional water or solvents such as benzene and cresylic acids does not serve to break the emulsion and allow ready separation.

It has been found that these tar emulsions contain a small amount of a solid insoluble material. It has further been found that this solid material usually present in an amount between about 3% and about 10% in the tars described above, may be readily removed by filtration after dilution with a good solvent.

These tars are at best only slightly soluble in aliphatic, naphthenic or olefinic hydrocarbons, and such solvents as butyl alcohol, Cellosolve, turpentine and acetone are not satisfactory solvents for these tars. It has been found, however, that highly aromatic liquids are excellent solvents for these tars. For example, benzene, toluene, xylene and the like are excellent solvents when substantially pure, are satisfactory if in a 60 to 70% aromatic mixture and are useable in a mixture containing only 50% of aromatics. Halogenated aromatic compounds are likewise suitable. Organic sulfides and such powerful solvents as chloroform are satisfactory, although a highly aromatic solvent is preferred. Not all of the tar is soluble in any of these solvents and a small amount of a thick emulsion layer will very slowly settle if the mixture is not processed in a reasonable length of time.

Attempts have been made to break this complex emulsion by treating the tar with benzene, and with such common emulsion breakers as alcohol, ferric chloride, phosphoric acid, contact clay, and heat. These treatments were however without effect.

However, it has been discovered that when the tar diluted with a good solvent is filtered and the small amount of solid material effectively removed, the filtrate will separate in a reasonably short time. This filtration is preferably conducted with the addition of a filter aid such as Johns-Manville "Celite" No. 535 in order to prevent plugging of the pores of the filter, but this procedure is not essential to the operation of this process. Filtration may be carried out at room temperature or if desirable, slightly elevated temperatures may be used. A feed rate of about 2 to about 6 barrels of tar per day per square foot of filter area has been found satisfactory, but the rate of feed will be determined by such factors as viscosity and temperature of feed stock, percent filter aid added, percent filter cake removed, and the like.

The filtrate removed may be separated into its component layers in any conventional type of settling apparatus adapted to the practice of this invention, or in a conventional centrifuge. The filtrate is preferably settled without unnecessary agitation since it has been found that prolonged agitation decreases the settling rate by as much as 50%. This settling operation is preferably carried out at slightly elevated temperatures although settling at room temperature may be desirable in some cases. The data shown in Table 1 was determined in a 3-inch pipe having a 9-foot liquid column. The data shows the tremendous advantage obtained in rate of settling by treating the tar by the process of this invention.

| Solvent, Per Cent by Volume | Temperature, ° F. | Settling Rate, Feet per hour | Sulfuric Acid in Tar, Per Cent by weight |
|---|---|---|---|
| 0 (unfiltered) | 80 | [1] 0.00 | 20.0 |
| 60 | 80 | 2.22 | 0.61 |
| 70 | 80 | 2.95 | 0.42 |
| 80 | 80 | 3.41 | 0.20 |

[1] Feet per week.

The dilute acid layer may be concentrated and reused in the acid treatment of other stocks, it may be utilized as is or treated in any desired manner. If utilization is not attractive, the acid layer may be discarded.

The small amount of acidity remaining in separated tar may be conveniently neutralized with a dilute alkaline solution. Aqueous caustic is very well adapted to this neutralization. A concentration of between about 1% and 10% aqueous sodium hydroxide has been found satisfactory for this neutralization.

The neutralized tar may be settled and the tar layer removed from the aqueous salt layer. A settling aid may be employed if desirable to assist in this settling operation. The degree of settling required will depend on the allowable ash content of the final acid free tar.

Tar removable from the neutralization settling tank is fed to the distillation column where the bulk of the solvent is readily removed by atmospheric distillation. The remainder of the solvent is recovered by distillation under vacuum or with steam if further recovery is desirable. The recovered solvent may be recirculated in the process indefinitely, it being only necessary to make up with a small amount of solvent for unavoidable losses.

A final acid free tar produced by this process has the appearance and many of the uses of asphalt. It is a good fuel, both by itself and mixed with cracked tar and cutter and may be used as a fuel in many applications and without the usual corrosive effect and fume nuisance of an acid tar.

The following examples are given for illustrative purposes only, and are not to be taken as limiting the invention to the precise details set forth.

*Example 1.*—A tar emulsion produced by the hydrolysis of a cracked naphtha sludge, and containing about 15% $H_2SO_4$ is mixed with a solvent consisting of a mixture of aromatic hydrocarbons boiling in the range of 340–470° F. to give a mixture containing 70% by volume of solvent. Filtration is carried out in a rotary precoat filter adding 0.8% (by weight of tar) of "Celite" filter aid which consists of diatomaceous silica. The filter is run at 47.3 revolutions per hour and at 110° F. A rate of 4.12 barrels of tar per day per square foot of filter area is maintained. The filtrate is settled in a tank at 80° F. The settling rate is 2.95 feet per hour and the tar layer separated contains 0.42% by weight sulfuric acid. This tar layer is removed and neutralized with a 5% aqueous caustic solution. The neutralized solution is settled, the tar layer withdrawn and subjected to atmospheric distillation. 92% of the solvent in the tar is thus recovered, the remainder being removed by steam distillation. Substantially acid free tar is recovered from the still pot.

*Example 2.*—A composite sample of emulsified tar produced by the hydrolysis of cracked naphtha sludge, straight run gasoline sludge, and reformed naphtha sludge and containing about 15% $H_2SO_4$, is diluted with the solvent of Example 1 to give a mixture having 60% by volume solvent. The mixture is filtered at the rate of 6.73 barrels of tar per day per square foot of filter area under the conditions of Example 1. The filtrate is settled in the aforementioned tank at a rate of 10.0 feet per hour and contains less than 0.5% sulfuric acid. The settled tar layer is removed, neutralized, and distilled as before. 90% of the solvent in the tar is recovered by atmospheric distillation and the remainder is recovered by vacuum distillation. Acid free tar is removed from the still pot.

While the character of this invention has been described in some detail and illustrations have been given of the use of this process, it is to be understood that the invention in its broader aspects is not limited thereto but includes modifications and variations within the scope of the appended claims.

I claim:

1. A process for producing acid-free tar from an emulsified acid tar derived by hydrolyzing in the presence of water and steam an acid sludge resulting from the treatment with sulfuric acid of a petroleum stock boiling in the boiling range of gasoline and kerosene to produce and separate thereby a dilute acid layer and a layer comprising said emulsified acid tar, which comprises mixing the emulsified acid tar with a solvent therefor consisting predominantly of a mixture of aromatic hydrocarbons boiling in the range of about 340° to 470° F., adding a small amount of diatomaceous silica filter aid to the resulting mixture and then passing it through a filter, permitting the filtrate to settle whereby it separates into an upper relatively acid-free tar layer and a lower relatively acid rich aqueous layer, separating the two layers and neutralizing residual acid in the tar layer with caustic, subjecting the neutralized tar to distillation to separate the solvent and to recover acid-free tar as a product.

2. The process as defined in claim 1 wherein the emulsified acid tar is obtained by hydrolyzing an acid sludge resulting from the treatment of cracked naphtha with sulfuric acid.

3. The process as defined in claim 1 wherein the emulsified acid tar is obtained by hydrolyzing an acid sludge resulting from the treatment of reformed naphtha with sulfuric acid.

4. The process as defined in claim 1 wherein the emulsified acid tar is obtained by hydrolyzing an acid sludge resulting from the treatment of straight run gasoline with sulfuric acid.

ROBERT J. MILLER.

REFERENCES CITED

The following references are of record in the file of this patent:

UNITED STATES PATENTS

| Number | Name | Date |
|---|---|---|
| 1,271,387 | Taveau | July 2, 1918 |
| 1,973,118 | Spencer | Sept. 11, 1934 |
| 2,228,527 | Meyer | Jan. 14, 1941 |
| 2,301,335 | Showalter | Nov. 10, 1942 |
| 2,320,242 | Kokatnur et al. | May 25, 1943 |